United States Patent [19]
Chalfin

[11] 3,784,899
[45] Jan. 8, 1974

[54] METAL DETECTION SYSTEM
[75] Inventor: Gregory T. Chalfin, Pasadena, Calif.
[73] Assignee: Aerojet-General Corporation, El Monte, Calif.
[22] Filed: Feb. 26, 1970
[21] Appl. No.: 17,986

[52] U.S. Cl............................ 324/6, 324/3, 324/4, 324/7
[51] Int. Cl............................................. G01v 3/12
[58] Field of Search .......................... 324/3, 4, 6, 7; 340/16 R

[56] References Cited
UNITED STATES PATENTS
3,395,338   7/1968   Barringer................................ 324/6
3,344,881   10/1967  White................................. 340/16 R Primary Examiner—Benjamin A. Borchelt
Assistant Examiner—S. C. Buczinski
Attorney—Edward O. Ansell and D. Gordon Angus

[57] ABSTRACT

In accordance with the present disclosure, the probability of the presence of metal in a predetermined region is determined by deriving representations of first and second antenna temperatures, each representative of the strength of received microwave signals of different polarizations. The probability of the presence of metal is determined by ascertaining the existance of a change in the antenna temperature of one polarization which is not coincident, in time, with a change in the antenna temperature of the other polarization. One method for ascertaining the probability of the presence of metal resides in deriving a representation of the average of the first and second antenna temperatures and a representation of the difference of the first and second antenna temperatures. A ratio is obtained by dividing the representation of the average of the first and second antenna temperatures by the representation of the difference between the first and second antenna temperatures to determine a representation of the probability of the presence of metal. One feature of the present invention resides in the provision of analog computer means for carrying out the process in accordance with the present invention.

14 Claims, 8 Drawing Figures

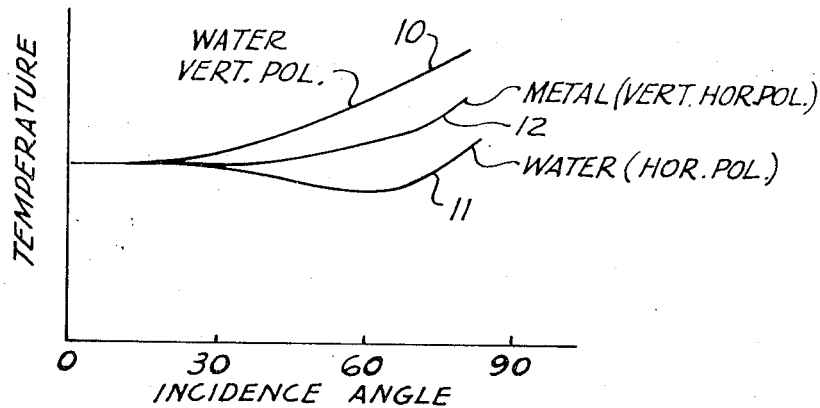
FIG.1
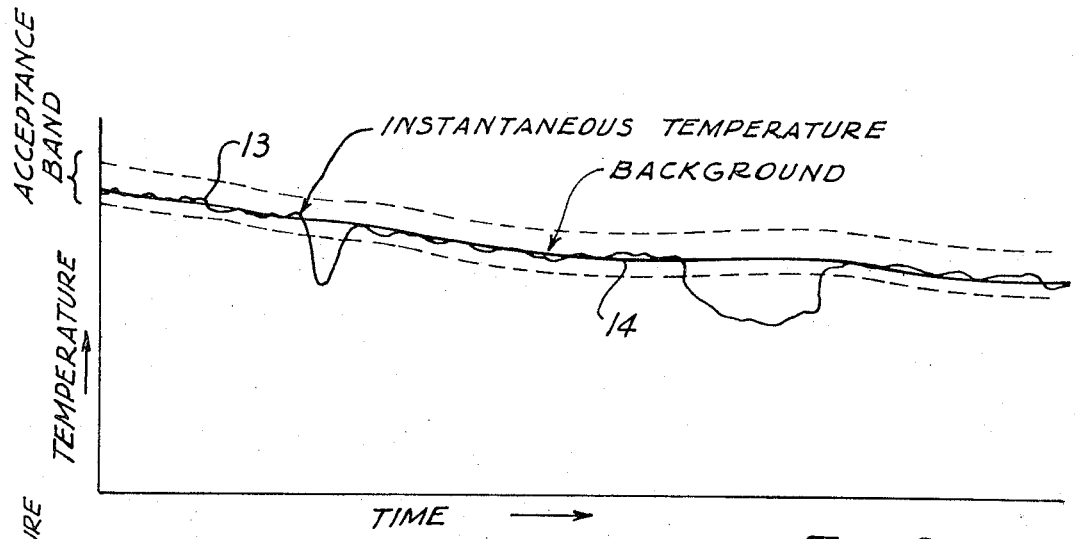
FIG.2A
FIG.2B
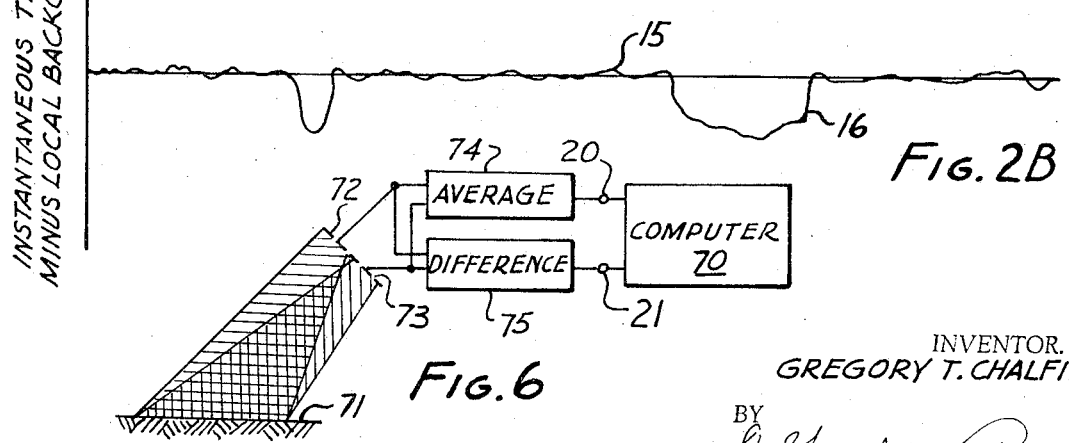
FIG.6
INVENTOR.
GREGORY T. CHALFIN
BY
D. Gordon Angus
ATTORNEY.

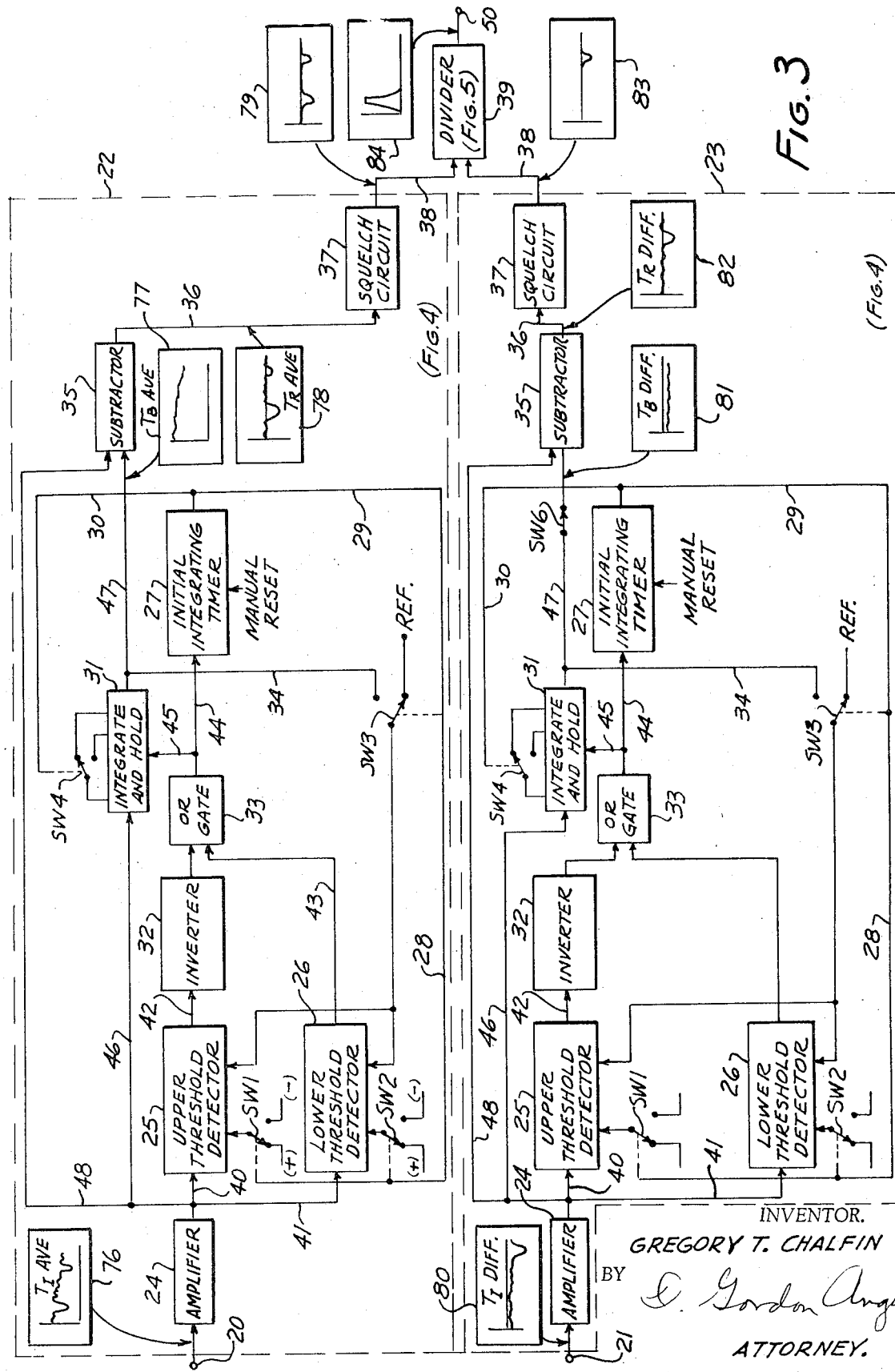

INVENTOR.
GREGORY T. CHALFIN
BY D. Gordon Angus
ATTORNEY.

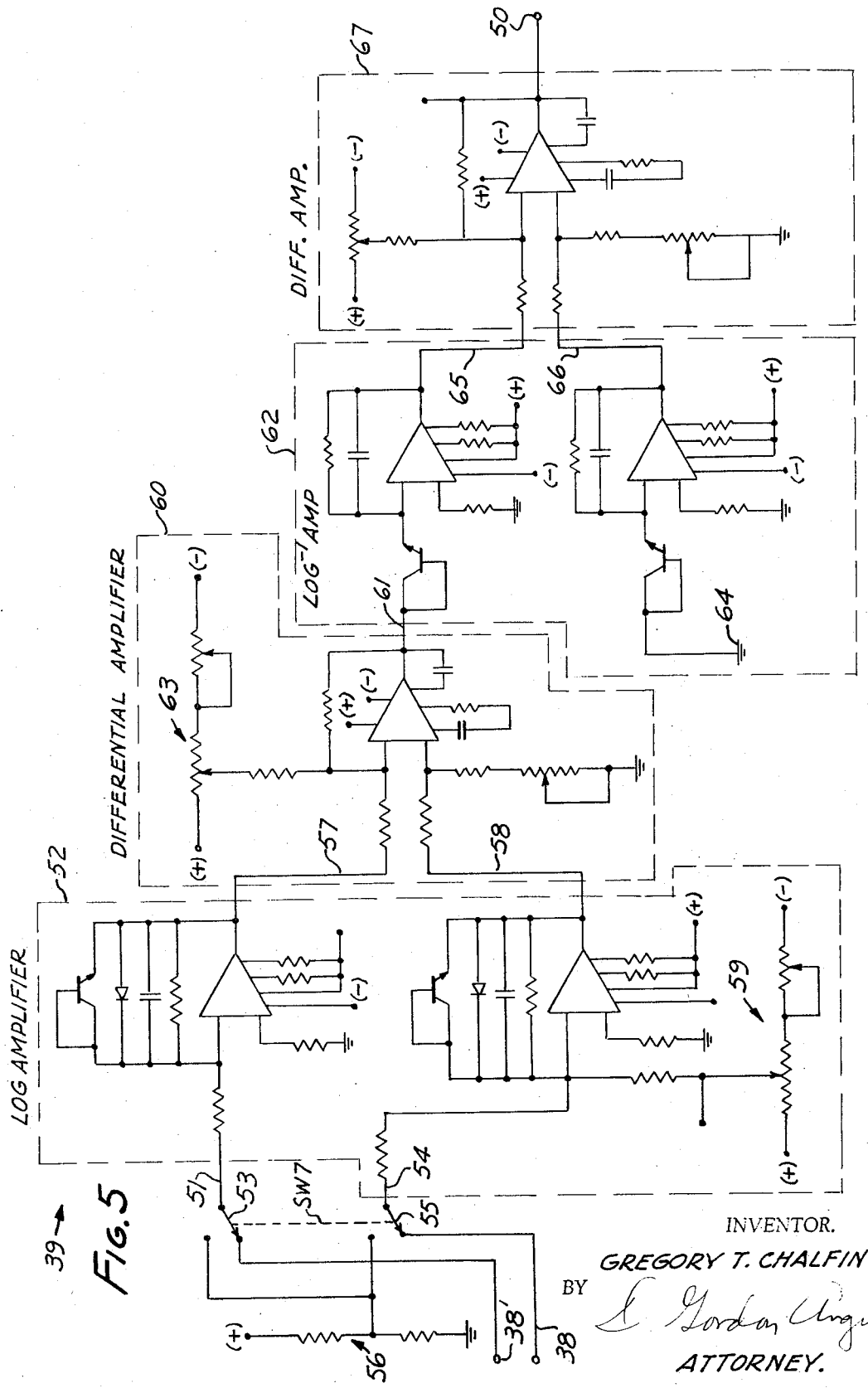

METAL DETECTION SYSTEM

This invention relates to metal detection systems, and particularly to systems for detecting metal by microwave radiation. The invention herein described was made in the course of or under a contract or subcontract thereunder with the U.S. Air Force.

It is known that metallic objects have a relatively low emissivity at microwave frequencies as compared to the emissivities of non-metallic objects. Hence, the microwave power received by a microwave antenna is lower if the power is received from metallic objects than what would be received from non-metallic objects. The received microwave power is ordinarily measured in degrees, and therefore such power is referred to as "antenna temperature." With existing sensitive microwave receivers, it is possible to detect even relatively small changes in antenna temperature. Hence, it is possible to detect a metal object even if the object comprises only a small fraction of the area in the field of view of the beam and therefore causes only a small change in antenna temperature.

One problem associated with the detection of metal objects by microwave radiometers resulted from the fact that some non-metallic objects, such as water, concrete, dirt, sand, and rock out-crops, can also effectuate a reduction or change of the antenna temperature. Thus, it has not always been possible to distinguish between metal and bodies of water or other relatively low emissive material. For example, the same reduction of antenna temperature could be caused either by a small metal target or by a larger body of water.

It is an object of the present invention to provide a method of detecting metal objects wherein metal objects may be distinguished from non-metallic objects.

Another object of the present invention is to provide a microwave metal detection system capable of distinguishing metal objects from other objects.

Another object of the present invention is to provide a metal detection system wherein a metal object may be distinguished from the background without regard to the ratio of the target to the field of view.

Another object of the present invention is to provide a microwave metal detection system wherein polarized microwave signals are utilized to distinguish metal objects from other objects.

According to one embodiment of the present invention, first and second microwave receiving antennas receive polarized signals from a region being scanned, the signals preferably being polarized at 90° from each other. The probability of the presence of metal in the region is determined by ascertaining the existance of a change in the antenna temperature associated with one polarization which is not accompanied by a change in antenna temperature associated with the other polarization.

Although the preferred form of the present invention utilizes a properly programmed digital computer to carry out the process of the present invention, the process according to the present invention can also be performed by an analog computer. Accordingly, one feature of the present invention is to provide apparatus capable of carrying out the process of the present invention.

According to one feature of the invention, an average antenna temperature signal and a difference antenna temperature signal are determined and the probability of the presence of metal is determined by dividing the average antenna temperature signal by the difference antenna temperature signal.

According to one feature of the present invention the average and difference antenna temperature signals are corrected before dividing the signals.

According to another feature of the invention, the average temperature signal and difference temperature signal are continuously corrected to eliminate the effects of changing backgrounds. This feature is particularly advantageous for metal detection systems for detecting metal from a moving craft, such as an aircraft. Thus, with the present invention, an aircraft in flight carrying the metal detection system in accordance with the present invention is capable of detecting metal objects on the ground.

The above and other features of this invention will be more fully understood from the following detailed description and the accompanying drawings, in which:

FIG. 1 is a graph showing antenna temperature plotted against the incidence angle of the received microwave radiation from various materials;

FIGS. 2A and 2B are graphs showing antenna temperature plotted against time in accordance with one example of the present invention;

FIG. 3 is a block diagram of an analog computer for detecting a metal target in accordance with one embodiment of the present invention;

FIG. 5 is a circuit diagram of a divider circuit for use in the block diagram circuit illustrated in FIG. 3;

FIG. 6 illustrates the manner in which the metal detection system may be used.

Figure 4:
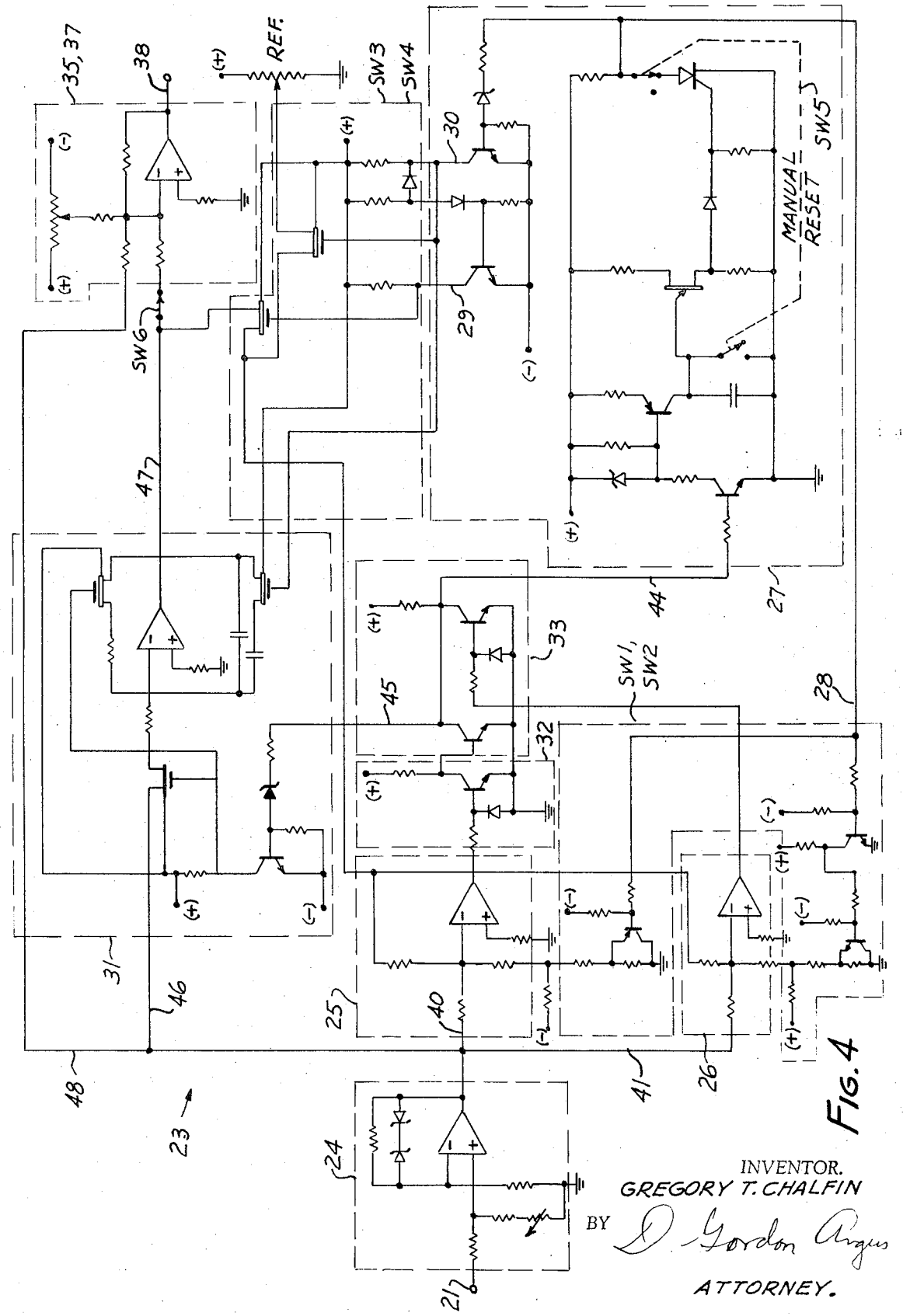
FIG. 4 is a circuit diagram of one channel of a metal detection system for use in the block diagram illustrated in FIG. 3.

I have found that metallic materials emit microwave radiation in substantially all planes of polarization at substantially even levels whereas non-metallic materials emit radiation in uneven levels in different planes of polarization. Hence, the antenna temperature of a microwave receiver is substantially the same for all received planes of polarization when the radiation is received from a metallic object whereas the antenna temperature differs for differently polarized radiation when the radiation is received from non-metallic objects. The present invention utilizes this phenomenon by utilizing the antenna temperature of a microwave receiver which receives from a region radiation of at least two different polarizations. The probability of metal in the region scanned is determined from the relative difference in antenna temperature.

FIG. 1 is a graph showing the antenna temperature of a microwave receiver plotted against the incidence angle of the radiation from a region for various objects viewed by the antenna. Curves 10 and 11 are representative of the antenna temperature for vertically and horizontally polarized microwave radiation received from a body of water, respectively, and curve 12 illustrates the antenna temperature for microwave radiation, both horizontally and vertically polarized, received from a metallic body. It should be understood that the microwave radiation may be emitted from the region scanned, or may be reflected from other sources. It can be noted from FIG. 1 that horizontally and vertically polarized microwave radiation result in different antenna temperatures when the polarized radiation is received from water. On the other hand, where the radiation is received from a metallic object, the effect of polarization on antenna temperature is not significant.

Thus, in accordance with the present invention, microwave antennas are arranged to receive at least two differently polarized microwave signals, and the antenna temperature due to each polarization is separately recorded. Thus, vertically polarized microwave signals may be received by one antenna and horizontally polarized signals may be received by the other antenna. The two antenna temperatures are compared to determine the probability of the presence of metal in the field of view. It should be understood that a single antenna can be arranged to detect microwave signals of at least two different polarizations for the purposes of the present invention, and therefore, while the invention may be described in connection with separate antennas, a single antenna adapted to receive and separately process both horizontally and vertically polarized radiation.

The present invention is particularly useful for detecting metallic objects from an aircraft while the aircraft is scanning a field of view. Thus, polarized radiation is reflected or emitted from the terrain and is received by a moving aircraft to determine the presence of metallic objects on the surface of the terrain. It is possible that as the aircraft views the continuously changing background fields of view, the microwave antenna temperatures could vary in accordance with changes in the background. This effect is illustrated in FIG. 2A which is a graph illustrating a waveform 13 representative of the instantaneous antenna temperature plotted against time. As illustrated in FIG. 2A, the instantaneous temperature, in addition to showing local variations due to different objects in the field of view, also is continuously varying at a slower rate represented by waveform 14. Waveform 14 thus represents the effect of changes of the background of the antenna temperature. Preferably, the effects of changes of the background are eliminated, such as by subtracting waveform 14 from waveform 13, to obtain a corrected or resultant waveform 15 illustrated in FIG. 2B. The presence of various objects, including metallic objects, bodies of water, etc., may cause the waveform 15 to exceed predetermined threshold values, illustrated at 16. This invention is concerned with determining which of the changes in signal intensity is caused by a metallic object.

Figure 7:
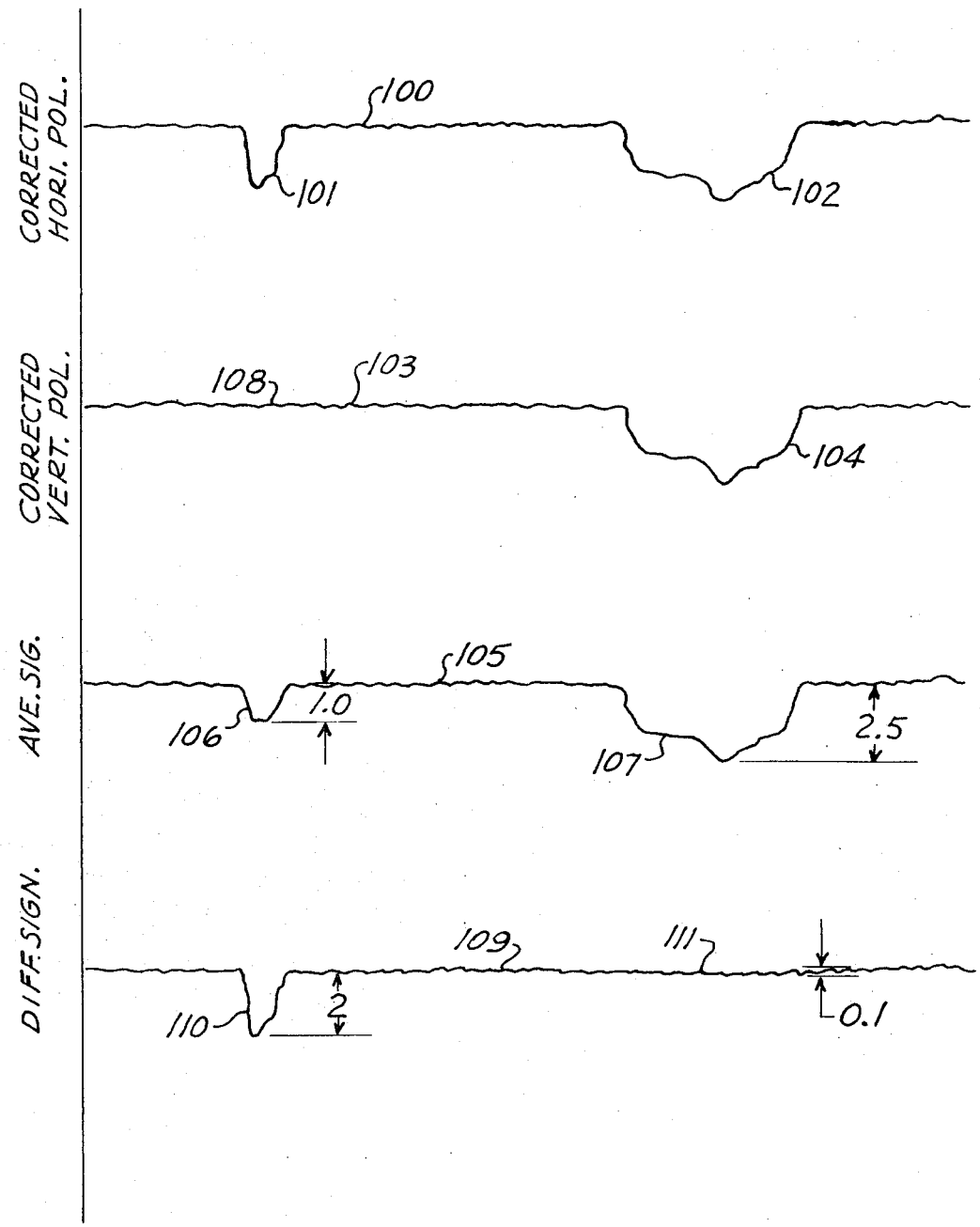
FIG. 7 is a illustration of certain waveforms for explaining the principles of the present invention.

FIG. 7 illustrates the manner by which metal is detected in accordance with the present invention. In FIG. 7, curve 100 includes valleys 101 and 102. Curve 100 is a corrected representation of the antenna temperature due to horizontally polarized microwave radiation. Curve 103 is a corrected representation of the antenna temperature due to vertically polarized microwave radiation and includes valley 104 which is in time coincidence with valley 102 in curve 100 and region 108 which is in time coincidence with valley 101 in curve 100. Curve 105 represents the average of the antenna temperatures associated with the vertical and horizontal polarization. In curve 105, the valley 106 is representative of the average of valley 101 in curve 100 and portion 108 in curve 103. Likewise, valley 107 of curve 105 is representative of the average of valleys 102 and 104 in curves 100 and 103, respectively. Curve 109 is representative of the difference between the curves 100 and 103, and valley 110 in curve 109 is representative of the difference between valley 101 in curve 100 and portion 108 in curve 103. Likewise, portion 111 of curve 109 is representative of the difference between valley 102 and valley 104 of curves 100 and 103, respectively. In the case of portion 111, since valleys 102 and 104 are substantially equal, the difference between the valleys is substantially zero and hence, portion 111 is an insignificant change from normal. On the other hand, valley 110 is indicative of the difference between portion 108 in curve 103 and valley 101 of curve 100, and hence, valley 10 is a significant valley in curve 109.

As indicated in FIG. 7, valley 106 is arbitrarily been assigned an amplitude value of 1.0. Valley 107, as compared to valley 106, is roughly 2-½ times the amplitude of valley 106 and hence, it is assigned an amplitude value of 2.5. In curve 109, valley 110 is assigned an amplitude value of two whereas portion 111, being an insignificant amplitude difference, is given an amplitude value of 0.1.

By dividing the average signal curve 105 by the difference signal curve 109, it can be ascertained that at the coincidence of valleys 106 and 110 the result of the division of one by two results in a ratio of probability of metal within the area being scanned of 0.5. On the other hand, at the coincidence of valley 107 and region 111, the division of signal 105 by 109 results in dividing 2.5 by 0.1 thereby resulting in a ratio of the probability of metal within the region scanned of 25.

It can be shown from FIG. 7 that it is not necessary to ascertain the average value of the antenna temperatures associated with the two polarizations. The invention can be accomplished by dividing the antenna temperature associated with either of the two polarizations by the difference between the antenna temperatures of both polarizations. Thus, the present invention is concerned with ascertaining or detecting a predetermined change in the antenna temperature associated with at least one of the two polarizations which is not time coincident with a predetermined change in the difference between the antenna temperatures associated with the two polarizations.

In accordance with the present invention the probability of the presence of metal in the scanned area is determined by dividing the signal representative of the corrected average antenna temperature by a signal indicative of a corrected difference antenna temperature. The numerator of the ratio is determined by subtracting a signal representative of the local background average antenna temperature from the signal representative of the instantaneous average antenna temperature and then squelching the resulting signal to thereby obtain a signal equal to zero if the result of the subtraction fails to exceed a predetermined value. If the resultant average antenna temperature signal does exceed the predetermined value, the numerator of the equation is equal to the resultant signal. Likewise, the denominator of the ratio is determined by subtracting a signal representative of the background difference antenna temperature from a signal representative of the instantaneous difference antenna temperature to obtain a resultant difference antenna temperature signal. If the resultant difference antenna temperature signal exceeds a predetermined value, the difference antenna temperature signal is taken as the denominator for the ratio. On the other hand, if the difference antenna temperature signal fails to exceed the predetermined value, the denominator of the ratio is zero.

In accordance with the presently preferred embodiment of the present invention, the antenna temperatures of both polarizations is sensed by suitable microwave receivers and the signals are fed into a digital computer. For the purposes of explanation, $T_V$ is the antenna temperature of the vertically polarized microwave radiation, and $T_H$ is the antenna temperature of the horizontally polarized microwave radiation. The instantaneous average antenna temperature, $T_I$ ave, is determined by adding the vertically polarized antenna temperature, $T_V$, to the horizontally polarized antenna temperature, $T_H$, and dividing the same by 2, and the average background antenna temperature, $T_B$ ave is determined by averaging the instantaneous average antenna temperature over some period of time, $\Delta t$. The instantaneous difference antenna temperature, $T_I$ diff, is found by determining the difference between the vertically polarized microwave antenna temperature, $T_V$, and the horizontally polarized microwave antenna temperature, $T_H$. The average difference background antenna temperature, $T_B$ diff, is determined by averaging the instantaneous difference antenna temperature, $T_I$ diff, over some period of time $\Delta t$.

The resultant average antenna temperature, $T_R$ ave, is determined by subtracting the average background antenna temperature, $T_B$ ave from the instantaneous average antenna temperature, $T_I$ ave. Likewise, the resultant difference antenna temperature, $T_R$ diff, is determined by subtracting the background difference antenna temperature, $T_B$ diff, from the instantaneous difference antenna temperature, $T_I$ diff. If the resultant average antenna temperature and the difference resultant antenna temperature exceed the respective threshold values (to thereby compensate for receiver noise and minor local variations of emination of microwave radiation), the probability of the presence of metal in the region scanned is determined by dividing the resultant average antenna temperature, $T_R$ ave, by the resultant difference antenna temperature, $T_R$ diff. The resultant ratio is indicative of the "metalness" in the field of view or, more accurately, the probability of metal within the field of view.

The following equations set forth the algorithm of a computer program for carrying out the process in accordance with the present invention:

$$T_V + T_H/2 = T_I \text{ ave} \tag{1}$$

$$T_I \text{ ave} \mid _{\Delta t} = T_B \text{ ave} \tag{2}$$

$$T_V - T_H = T_I \text{ diff} \tag{3}$$

$$T_I \text{ diff} \mid _{\Delta t} = T_B \text{ diff} \tag{4}$$

$$T_I \text{ ave} - T_B \text{ ave} = T_R \text{ ave} \tag{5}$$

$$\text{If } T_R \text{ ave} > \tau \text{ ave}, N = T_R \text{ ave} \tag{6}$$

$$\text{If } T_R \text{ ave} \leq \tau \text{ ave}, N = 0 \tag{7}$$

$$T_I \text{ diff } T_B \text{ diff} = T_R \text{ diff} \tag{8}$$

$$\text{If } T_R \text{ diff} > \tau \text{ diff}, D = T_R \text{ diff} \tag{9}$$

$$\text{If } T_R \text{ diff} \leq \tau \text{ diff}, D = 0 \tag{10}$$

$$\text{Probability Ratio} = N/D \tag{11}$$

where $\tau$ ave and $\tau$ diff are predetermined threshold antenna temperatures.

FIG. 6 illustrates apparatus for carrying out the process of the present invention in accordance with the presently preferred embodiment of the present invention. Antenna 72 receives horizontally polarized microwave radiation from region 71 while antenna 73 receives vertically polarized microwave radiation from region 71. Microwave receivers are connected to each antenna 71 and 72 to provide inputs to average circuit 74 and difference circuit 75. Average circuit 74 determines the average antenna temperature associated with the polarized radiation and difference circuit 75 determines the difference between the antenna temperatures of the polarized radiation. Average circuit 74 produces an output signal, $T_I$ ave, to terminal 20 indicative of the instantaneous average antenna temperature, while difference circuit 75 produces an output signal, $T_I$ diff, to terminal 21 indicative of the instanteous difference between the antenna temperatures of the two polarizations. Terminals 20 and 21 are connected to an electronic general purpose digital computer 70 which may, like the other apparatus, be carried in a suitable aircraft or helicopter (not shown) for scanning region 71. The digital computer has programmed into it a computer program having the algorithm set forth in equations 1–11, above.

Although the presently preferred embodiment of the present invention anticipates the use of a digital computer aboard a helicopter or aircraft, the average antenna temperature and difference antenna temperature may be determined aboard the aircraft and permanently recorded, such as on magnetic tape or the like, for later processing in a digital computer. Alternatively, telemetry signals representative of the average and difference antenna temperatures may be transmitted from the aircraft to a central processing laboratory where a digital computer receives such telemetry signals and determines the probability ratio.

Although the present invention has been described in connection with performing the process on a digital computer, it is to be understood that other apparatus may be utilized, such as a analog computer. Such analog computer apparatus is illustrated in FIGS. 3 – 5. Referring particularly to FIG. 3 which is a block diagram of the circuit illustrated in FIGS. 4 and 5, there is illustrated a first input 20 and a second input 21, which may be connected to terminals 20 and 21, respectively in FIG. 6. Inputs 20 and 21 are capable of receiving signals indicative of the average instantaneous antenna temperature, $T_I$ ave, and the instantaneous difference antenna temperature, $T_I$ diff, respectively. The input signals are operated by separate channels 22 and 23. Channels 22 and 23 are substantially identical, channel 23 being illustrated in greater detail in FIG. 4. Since the two channels are substantially identical, detailed description of only one channel need be given and reference to the description and operation of one channel may be had to understand the operation of the other channel.

Each channel includes an input amplifier 24 connected to the respective input terminal 20 or 21. The output of amplifier 24 is connected via lead 40 to upper threshold detector 25 and via lead 41 to lower threshold detector 26. Initial integrating timer 27 is connected via lead 28 to switches SW1 and SW2, via lead 29 to SW3, and via lead 30 to switch SW4. As will be more fully understood hereinafter, switches SW1, SW2, SW3 and SW4 are electronic switches, such as switching transistors, operable by a signal from timer 27. Upper threshold detector 25 has a first level input connected through switch SW1 to a reference potential, and lower threshold detector 26 is connected through switch SW2 to a second reference potential. The upper and lower threshold detectors 25 and 26 also have a second level input connected through switch SW3 to a reference potential, REF., or to the output of integrate and hold circuit 31, depending upon the mode of operation of switch SW3. The output of upper threshold detector 25 is connected via lead 42 to invertor 32 whose output is connected to one input of OR gate 33. The output of lower threshold detector is connected via lead 43 to the other input of OR gate 33. OR gate 33 is connected via lead 44 to the input of initial integrating timer 27 and via lead 45 to one input of integrate and hold circuit 31. The other input of integrate and hold circuit 31 is connected via lead 46 to the output of amplifier 24.

The output of integrate and hold circuit 31 is connected via lead 34 to one side of SW3. The output of integrate and hold circuit 31 is also connected via lead 47 to one input of subtractor circuit 35 whose other input is connected via lead 48 to the output of amplifier 24. The output of subtractor circuit 35 is connected via lead 36 to squelch circuit 37 whose output is connected via lead 38 or 38' to divider circuit 39, illustrated in greater detail in FIG. 5.

As illustrated particularly in FIG. 4, initial integrating timer 27 may be reset by means of switch SW5 which is a manual switch capable of resetting the timer to zero. Also, as illustrated particularly in FIGS. 3 and 4, channel 23 differs from channel 22 by the provision in channel 23 of a manually operable switch SW6 in lead 47 between the output of integrate and hold circuit 31 and the input of subtractor circuit 35. As will be more fully understood hereinafter, channel 23 is the circuit for determining the resultant difference antenna temperature, or the denominator of the above identified ratio. As will be made more fully understood hereinafter switch SW6 is provided to disable the signal relating to local background antenna temperature in the difference channel.

Divider circuit 39 receives an input representative of the resultant average antenna temperature, $T_R$ ave, via lead 38 and an input representative of the resultant difference antenna temperature, $T_R$ diff, via lead 38. Divider circuit 39 divides the resultant average antenna temperature signal appearing on lead 38' by the resultant difference antenna temperature signal appearing on line 38 and provides an output representative of the probability of metal ratio via output 50. With reference particularly to FIG. 5, the signal appearing at input 38' is fed to one input 51 of log amplifier 52 through contact 53 of manually operable switch SW7, and the signal appearing at lead 38 is fed to a second input 54 of log amplifier 52 through contact 55 of switch SW7. Switch SW7 is operable to a second position from that illustrated in the drawings to connect inputs 51 and 54 of log amplifier 52 to a reference bridge illustrated generally at 56.

Log amplifier 52 comprises a pair of substantially identical amplifier channels and produces signals at outputs 57 and 58 representative of the logarithm of the signals appearing at inputs 51 and 54, respectively. Bias adjustment 59 may be provided for adjusting the bias of log amplifier 52.

The signals appearing at leads 57 and 58 are imposed on separate inputs of differential amplifier 62 which in turn provides an output at 61 to inverse log amplifier 62. Preferably, differential amplifier 60 includes a ratio sensitivity circuit 63 for selectively adjusting the ratio sensitivity of the differential amplifier 60. Inverse log amplifier 62 determines the inverse logarithm of the signals appearing at input 61 and the inverse logarithm of reference signals derived via ground 64. The signals derived by inverse log amplifier 62 are transmitted via lead 65 and 66 to the input to differential amplifier 67. Differential amplifier 67 provides an output at terminal 50 indicative of the ratio of the signal appearing at input 38' to the signal appearing at input 38. Thus, the signal appearing at terminal 50 is indicative of the probability of the presence of metal in the area scanned by the microwave antennas.

In the operation of the system illustrated in FIGS. 3–6, microwave radiation is reflected or otherwise emitted from the surface 71 of the terrain. For example, the surface 71 may include metallic objects as well as bodies of water, vegetation, and other objects. A pair of receiving antennas 72 and 73 receive polarized microwave radiation which is oriented in different planes. For example, antenna 72 may be adapted to receive only horizontally polarized radiation whereas antenna 73 may be adapted to receive only vertically polarized radiation. Suitable microwave receivers are connected to antennas 72 and 73 and are connected to the inputs of average circuit 74 and to the inputs of difference circuit 75. Average circuit 74 produces a signal indicative of the average antenna temperature of the two polarizations to output terminal 20 and difference circuit 75 produces a signal indicative of the difference between antenna temperatures of the two polarizations at terminal 21. The signal appearing at terminal 20, which may hereandafter be referred to as the instantaneous average antenna temperature, $T_I$ ave is illustrated generally at waveform 76 in FIG. 3 and provides the input to one amplifier 24.

Initially, initial integrating timer 27 operates on switches SW3 so that switch SW3 connects reference signal, REF, to upper threshold detector 25 and lower threshold detector 26. Switch SW4 is conditioned so that integrate and hold circuit 31 integrates signals on lead 46. Switches SW1 and SW2 provide predetermined reference signals to threshold detectors 25 and 26.

Instantaneous average antenna temperature signal, $T_I$ ave, appearing at input 20 are amplified by amplifier 24 and forwarded to integrate and hold circuit 31. The signals are integrated to determine the average value of the signal over some period of time, $\Delta t$. The integrated signals are impressed on output leads 47 and 34. Assuming the signals $T_I$ ave, from amplifier 24 trigger on one or the other of the threshold detectors 25 and 26, OR gate 33 is operated to initiate operation of initial integrating timer 27. Initial integrating timer 27 operates on integrate and hold circuit 31 so that circuit 31 integrates the changing signal, $T_I$ ave, over some period of time, $\Delta t$, to provide an output, $T_B$ ave, via lead 47 and 34 which is representative of the average value of the instanteous average antenna temperature. Also, initial integrating timer 27 operates on switch SW3 to connect integrate and hold circuit to the upper and lower threshold detectors 25 and 26.

As additional signals, $T_I$ ave, are processed, they are initially compared to the value, $T_B$ ave, of the previous signals attributed to background by the threshold circuits 25 and 26 to determine if new signals differ by a predetermined amount from the old background signal. If the new signals do differ by a predetermined value, OR gate 33 operates on timer 27 to initiate operation of integrate and hold circuit 31 to determine a new value of average background antenna temperature, $T_B$ ave. Thus, integrator 31 operates to continuously change the average back-ground antenna temperature signal to subtractor circuit 35 in accordance with fields of view of terrain.

Since the signals from amplifier 24 are indicative of the instantaneous average antenna temperature, $T_I$ ave, and the signals from integrate and hold circuit 31 are indicative of the average background antenna temperature, $T_B$ ave, the subtractor 35 operates to subtract the background antenna temperature from the instantaneous antenna temperature to derive a corrected or resultant average antenna temperature $T_R$ ave. Likewise, in channel 23, subtractor circuit 25 operates to subtract the back-ground difference antenna temperature, $T_B$ diff, indicated generally at 81, from the instantaneous difference antenna temperature, $T_I$ diff, indicated generally at 80, to develop a corrected or resultant difference antenna temperature 82, $T_R$ diff. In each case, the resolved signals are squelched by respective circuits 37 to produce the signals indicated at 79 and 83, respectively.

Divider circuit 39 operates to divide the signal 79 by the signal 83, to develop a signal 84 indicative of the ratio of the two signals, which is the probability of the presence of metal in region 71.

At any time, such as prior to scanning a region, the initial integrating timer 27 may be reset by operation of manually operable switch SW5. Resetting the timer causes re-evaluation of the signal developed by the integrate and hold circuit, thereby exerting manual control over the apparatus. Also, the integrate and hold circuit output via lead 47 in channel 23 may be disconnected from subtractor 35 so that the output via lead 38 to the divider circuit is representative of the instantaneous difference antenna temperature, $T_I$ diff. In the event that the effect of background on the difference signal $T_I$ diff is insignificant, switch SW6 in channel 23 may be opened to eliminate any effect of noise in the threshold and integrator circuits in channel 23.

The present invention thus provides a novel method for determining the presence of metal in a region. The method is effective and is capable of detecting metal objects even though they are camouflaged. The method may be accomplished through the use of polarized microwave receiving antennas aboard an aircraft to provide a continuous view of a region. The signals thus derived may thereafter be transmitted back to a central processing unit to complete the process or, alternatively, may be processed directly on board the aircraft. As yet another alternative, the data sensed by the microwave antennas could be permanently recorded for later processing. One feature of the invention resides in analog computer apparatus for processing the data to determine the beamfill ratio.

This invention is not to be limited by the embodiment shown in the drawings and described in the description, which are given by way of example and not of limitation.

What is claimed is:

1. A method of determining the probability of the presence of metal in a predetermined region, said method comprising the steps of:
   a. deriving a representation of a first temperature derived by receipt of radiation of a first polarization from said region,
   b. deriving a representation of a second temperature derived by receipt of radiation of a second polarization from said region,
   c. deriving a representation of the average of said first and second temperatures,
   d. deriving a representation of the difference between said first and second temperatures, and
   e. dividing a predetermined change in the representation of the average of the first and second temperatures by a predetermined change in the representation of the difference between the first and second temperatures.

2. A method according to claim 1 further including deriving a representation of a background temperature, said representation of the average of said first and second temperatures being obtained by subtracting the representation of said background temperature from the average of the representations of said first and second temperatures, and said representation of the difference between said first and second temperatures being obtained by subtracting the representation of said background temperature from the difference between the representations of the first and second temperatures.

3. A method according to claim 2 further including setting the representation of the average of said first and second temperatures to zero when the result of the subtraction of the representation of the background temperature from the average of the representations of said first and second temperatures fails to exceed a first predetermined level, and setting the representation of the difference between said first and second temperatures to zero when the result of the subtraction of the representation of the representation of the background temperatures from the difference between the representations if the first and second temperatures fails to exceed a second predetermined level.

4. A method according to claim 1 wherein the radiation of a first polarization and the radiation of a second polarization comprise of respectively differently polarized microwave radiation.

5. Apparatus for determining the presence of metal in a region comprising: first receiver means for determining the strength of a first radiation of a first polarization received from said region; second receiver means for determining the strength of a second radiation of a second polarization received from said region, said second polarization being different from said first polarization; difference means connected to said first and second means for deriving a representation of the difference between the strengths of said first and second radiations; and determining means connected to said first, second and third means for detecting a predetermined change in the strength of at least one of said first and second radiations which is not time coincident with a predetermined change in the difference between the strengths of said first and second radiations.

6. Apparatus according to claim 5 wherein said determining means comprises averaging means connected to said first and second receiver means for deriving a representation of the average of the strengths of said first and second radiations, and divider means connected to said averaging means and to said difference means for dividing the representation of the average of the strengths of the first and second radiations by the representation of the difference between the strengths of said first and second radiations.

7. Apparatus according to claim 6 wherein said averaging means comprises an average circuit connected to said first and second receiver means for producing a first signal representative of the average of the radiation strengths received by said first and second receiver means, first integrator means connected to said average circuit for integrating said first signal to produce a first integral signal, and first subtraction means connected to said average circuit and to said first integrator means for subtracting said first integrated signal from said first signal to produce a resultant average signal; and wherein said difference means comprises a difference circuit connected to said first and second receiver means for producing a second signal representative of the difference between the radiation strengths received by said first and second receiver means, integrator means connected to said difference circuit for integrating said second signal to produce a second integrated signal, and second subtraction means connected to said difference circuit and to said second integrator means for subtracting said second integrated signal from said second signal to produce a resultant difference signal, said divider means dividing said resultant average signal by said resultant difference signal.

8. Apparatus according to claim 7 further including threshold means for establishing first and second threshold signals, first squelch means connected to said threshold means and to said first subtraction means for setting said resultant average signal to zero when it does not exceed said first threshold signal, and second squelch means connected to said threshold means and to said second subtraction means for setting said resultant difference signal to zero when it does not exceed said second threshold signal.

9. Apparatus according to claim 7 wherein said first integrator means comprises first integrate circuit connected to said average circuit, first sensing means connected to said average circuit for detecting changes in said first signal, first timer means connected to said first sensing means for initiating said first integrator means in response to said first sensing means, and second integrator means comprises second integrate circuit connected to said difference circuit, second sensing means connected to said difference circuit for detecting changes in said second signal, second timer means connected to said second sensing means for initiating, said second integrator means in response to said second sensing means.

10. Apparatus for determining the presence of metal in a region comprising: first receiving means for receiving microwave radiation of a first polarization from said region and for providing a first signal having a value dependant upon the strength of said first radiation; second signal receiving means for receiving microwave radiation of a second polarization from said region and for providing a second signal having a value dependant upon the strength of said second radiation; and electronic digital computer means for receiving said first and second signals, said computer means being programmed to respond to said first and second signals to determine the existence of a predetermined change of the value of at least one of said first and second signals which is not time coincident with the existence of a predetermined change of the difference between the values of said first and second signals.

11. Apparatus according to claim 10 wherein said computer is programmed to respond to said first and second signals to determine the average of the values of said first and second signals and to determine the difference between the values of said first and second signals and to divide the average so determined by the difference so determined to obtain a representation of the probability of metal present in said region.

12. Apparatus according to claim 11 wherein said computer means is further programmed to respond to the representation of the average of the values of said first and second signals to integrate the average value and to subtract the integrated average value from the average value to obtain a corrected average value, and said computer means is further programmed to respond to the representation of the difference between the values of said first and second signals to integrate the difference value and to subtract the integrated difference value from the difference value to obtain a corrected difference value, the computer means dividing the corrected average value by the corrected difference value.

13. Apparatus according to claim 12 wherein said computer means is further programmed to perform the division only when either the difference value or the average value exceeds respective predetermined values.

14. Apparatus according to claim 11 wherein said computer means is further programmed to perform the division only when either the difference value or the average value exceeds respective predetermined values.

* * * * *

UNITED STATES PATENT OFFICE
CERTIFICATE OF CORRECTION

Patent No. 3,784,899　　　　　　　　Dated January 8, 1974

Inventor(s) Gregory T. Chalfin　　　　　　　Page 1 of 2

It is certified that error appears in the above-identified patent and that said Letters Patent are hereby corrected as shown below:

In the Abstract, line 7, "existance" should read -- existence --.

Column 1, line 29, "emissive" should read -- emissivity --.

Column 1, line 41, between "the" and "target" -- size of -- should be inserted.

Column 1, line 51, "existance" should be -- existence --.

Column 3, line 19, between "antenna" and "adapted" -- may be -- should be inserted.

Column 3, line 39, "of" should read -- on --.

Column 4, line 12, "10" should read -- 110 --.

Column 4, line 53, "resulting" should read -- resultant --.

Column 5, line 14, "same" should read -- sum --.

Column 6, line 22, " - " should read -- = --.

Column 7, line 10, after "operated" -- on -- should be inserted.

Column 8, lines 45 and 46, "reflected or otherwise emitted" should be deleted and -- emitted or reflected -- should be inserted therefor.

Column 8, line 63, "hereandafter" should read -- hereinafter --.

Column 9, line 59, "is" should read -- represents --.

UNITED STATES PATENT OFFICE
CERTIFICATE OF CORRECTION

Patent No. 3,784,899      Dated January 8, 1974

Inventor(s) Gregory T. Chalfin      Page 2 of 2

It is certified that error appears in the above-identified patent and that said Letters Patent are hereby corrected as shown below:

Claim 3, column 10, line 67, "of the representation" should be deleted.

Claim 5, column 11, lines 19 and 20, "a predetermined" should read -- any significant --.

Claim 7, column 11, line 41, "integral" should read -- integrated --.

Claim 10, column 12, line 25, "dependant" should read -- dependent --.

𝔖igned and 𝔖ealed this

Ninth 𝔇ay of November 1976

[SEAL]

Attest:

RUTH C. MASON
*Attesting Officer*

C. MARSHALL DANN
*Commissioner of Patents and Trademarks*